United States Patent Office

3,613,373
Patented Oct. 19, 1971

3,613,373
HYBRID HIGH ENERGY PROPULSION METHOD
Martin H. Kaufman, China Lake, Calif., assignor to the United States of America as represented by the Secretary of the Navy
No Drawing. Filed Mar. 13, 1964, Ser. No. 352,432
Int. Cl. C06d 5/10
U.S. Cl. 60—219                                       6 Claims The invention described herein may be manufactured and used by or for the Government of the United States of America for governmental purposes without the payment of any royalties thereon or therefor.

The present invention relates to an improved high energy propellant and to the preparation thereof.

In the field of propellant chemistry much work has been directed toward developing a more energetic propellant system. Two criteria are most widely used in evaluating a good propellant. The first of these is specific impulse, which is defined as the thrust produced by burning one pound of propellant per second. The other is the burnt velocity or boost velocity. Where specific impulse is a property of the propellant chemistry, the burst velocity depends also on propellant density, and on the weight of hardware and the volume available for propellant. In order to achieve good performance, as measured by burnt velocity, the same considerations apply for obtaining high specific impulse, but consideration must also be given to propellant density, and to the optimum trade-off between specific impulse and density. In order to provide a more energetic propellant, work has been directed toward finding an energetic binder because most of the binders utilized today reduce the energy and density of the propellant system. The present invention uses a high energy, high density binder in combination with other components which produces an improved composition for both hybrid and solid propellant application.

It is therefore an object of this invention to provide a propellant for use in a missile designed to have high boost velocity during the early part of flight.

Another object is to provide a propellant which has high specific impulse for use in a missile which needs high thrust during the late stages of flight when it is at high altitude.

A further object of the invention is the provision of a solid propellant which has relatively safe handling characteristics.

Still another object is to provide a solid propellant which is useful in hybrid propellant systems.

Yet another object is to produce a propellant which has the merits of stability and spontaneous ignition with strong oxidizing agents.

Other objects, features and many of the attendant advantages of this invention will become readily appreciated as the same become better understood by reference to the following detailed description.

The present invention uses hydrazines and/or hydrazine derivatives, such as dimethyl hydrazine, as plasticizers in a plastisol concept wherein the polymer plus the high energy fuel plasticizer has gel properties thereby permitting it to be loaded with additional solids, and in particular with high energy metals and mixtures thereof. This irreversible gel system in which the solid phase is composed of gelled hydrazine and/or derivatives and metal was coupled with a liquid injectant such as nitrogen tetraoxide, chlorine trifluoride, perchlorofluoride, tetranitromethane and mixtures thereof to produce a hybrid propellant with a delivered performance equivalent to that of a hypothetical propellant with a measured density of 1.96 g./cm.$^3$ and a measured specific impulse of 272 lb.-sec./lb. This appears to put the hybrid propellant system in competition with the liquid and solid propellant systems. Normally, hydrazine or hydrazine derivatives could be used as liquid, high energy fuels where it is injected into a chamber along with a liquid oxidizer. The density of such systems are low due to the fact that these liquids alone have low densities. As hereinbefore mentioned, density plays an important part in boost applications. One can get a gain in density by using this low density liquid with a hgh density metal and this invention shows how these may be combined in a solid to do just that. The alkali metal salts of carboxymethylcellulose especially in the presence of other hygroscopic groups such as hydroxyl, dissolved in hydrazine, form a thick, viscous, uncrosslinked gel. The addition of multivalent ions then crosslinks the polymer at the carboxyl group by replacement of the alkali metal. Polymers that have been found to be successful in addition to carboxymethylcellulose salts are salts of alginic acid. The crosslinkers which worked were salts of aluminum such as basic aluminum acetate and aluminum sulfate.

The following examples will better illustrate the present invention, but should in no way be considered as limiting the invention.

EXAMPLE I

A hydrazine gel was first prepared at ambient temperature by dissolving about 1% by weight aluminum acetate in 90% by weight liquid hydrazine, then 9% by weight sodium carboxymethylcellulose was stirred into the hydrazine solution until a homogenous mixture resulted. Aluminum of average particle size of $5\mu$–$30\mu$ was now stirred into the mixture and in about 15 minutes the mix thickened. It was poured into molds suitable for loading into test rocket motors and on standing overnight a gray, tough non-reversible gel formed. This material formed the solid fuel phase of a hybrid propellant system and liquid nitrogen tetraoxide was used as the injectant or liquid phase.

New sensitive oxidizers and fuels which may be mutually co-reactive and would ordinarily require encapsulation, are now simply made part of separate phases. Thus, a positive separation of the reactants insures safety during storage.

EXAMPLE II

A hydrazine gel was prepared as described in Example I using 1% by weight aluminum sulfate in 90% by weight liquid hydrazine, then about 9% by weight sodium alginate was dissolved in the hydrazine solution until a homogenous mixture resulted. To this mixture 30–60% by weight zirconium, $22\mu$ average particle size, was added and after thorough mixing the thick mix which resulted was poured into containers. On standing overnight, a tough, non-reversible gel formed. This material formed the solid fuel phase of a hybrid system and chlorine trifluoride was used in the liquid phase of a hybrid propellant system.

The hydrazine gel was formed first, because the "gel structure" property prevents the solid additives from settling. Among the additives which were loaded into the gel, and which work well but provide differences in energy and density is high energy beryllium alone or in mixtures with other metals. Beryllium is known to increase propellant energy. Zirconium, thorium, and uranium and other heavy metal fuel will provide increased densities alone or in mixtures with beryllium, boron or aluminum.

Dimethylhydrazine was gelled in the same manner as set out in Example I, and mixed with aluminum. It was used in a hybrid system with nitrogen tetraoxide as the oxidizer injectant in the liquid phase.

Other oxidizers which may be used in the liquid or injectant phase of the hybrid propellant system are perchlorofluoride, tetrafluorohydrazine, hydrogen peroxide, nitric acid, tetranitromethane, tri(difluoroamine) fluoromethane and mixtures thereof.

The particle sizes of the metal mixed with the gel are carefully considered. It was found, for example, that settling was less pronounced with hydrazine gels containing 1μ boron than with those containing 5μ aluminum. The formulations consisting of hydrazine gel and/or hydrazine derivatives in the gel state make good solid rocket propellant grains alone. When loaded with solid fuel additives, such as the metals or mixtures thereof described above, more energetic solid rocket propellant grains result. Hydrazine ignites spontaneously with the halogens, liquid oxygen, hydrogen peroxide and other strong oxidizing agents disclosed herein. Therefore, the use of the present invention in the solid phase of the hybrid propellant system promises to give to the rocket industry another high-energy propellant which can be produced on an economical large scale.

Obviously many modifications and variations of the present invention are possible in the light of the above teachings. It is therefore understood that within the scope of the appended claims the invention may be practiced otherwise than as specifically described.

What is claimed is:

1. A solid fuel comprising the following constituents:

| Constituent: | Percent by weight |
|---|---|
| Hydrazine gel | 40–70 |
| Zirconium | 30–60 | said hydrazine gel consisting essentially of about 1% by weight aluminum acetate, 9% by weight sodium alginate, and 90% by weight hydrazine.

2. A solid fuel comprising the following constituents:

| Constituent: | Percent by weight |
|---|---|
| Dimethylhydrazine gel | 70–90 |
| Aluminum | 10–30 | said dimethylhydrazine gel consisting essentially of about 1% by weight aluminum acetate, 9% by weight carboxymethylcellulose, and 90% by weight dimethyl hydrazine.

3. The method of producing thrust by burning a fuel and oxidizer in the combustion chamber of a hybrid rocket comprising
  (a) providing a solid fuel consisting essentially of from 40 to 70 percent by weight hydrazine gel and from 30 to 60 percent by weight zirconium in the combustion chamber; said hydrazine gel consisting essentially of about 1% by weight aluminum sulfate, 9% by weight sodium alginate, and 90% by weight hydrazine, and
  (b) injecting a liquid oxidizer consisting of chlorine trifluoride onto said fuel in a ratio of 75 parts oxidizer to 25 parts fuel.

4. The method of producing thrust by ejecting from a combustion chamber the gaseous products produced by combustion of a solid fuel consisting essentially of from about 40 to about 70 percent by weight of an irreversible gel and from about 30 to 60 percent by weight of a metal powder; said gel consisting essentially of about 90% by weight of a member selected from the group consisting of hydrazine, dimethylhydrazine and mixtures thereof; about 9% by weight of a member selected from the group consisting of alkali metal salts of alginic acid and carboxymethylcellulose salts; and about 1% by weight of a crosslinker selected from the group consisting of aluminum acetate and aluminum sulfate; said metal powder selected from the group consisting of aluminum, zirconium, beryllium, thorium, uranium, boron and mixtures thereof; comprising
  injecting a liquid oxidizer in a ratio of about 75 parts oxidizer to 25 parts solid fuel into said combustion chamber; said oxidizer selected from the group consisting of nitrogen tetraoxide, chlorine trifluoride, perchlorofluoride, tetrafluorohydrazine, hydrogen peroxde, nitric acid, tetranitromethane, tri(difluoroamine)fluoromethane and mixtures thereof.

5. The method of producing thrust by ejecting from a combustion chamber the gaseous products produced by combustion of a solid fuel comprising from 40 to 70 percent by weight hydrazine gel and from 30 to 60 percent by weight zirconium; said hydrazine gel consisting essentially of about 1% by weight aluminum sulfate, 9% by weight sodium alginate, and 90% by weight hydrazine, comprising
  injecting chlorine trifluoride into said combustion chamber in a ratio of 75 parts chlorine trifluoride to 25 parts solid fuel.

6. The method of producing thrust by ejecting from a combustion chamber the gaseous products produced by combustion of a solid fuel comprising from 70 to 90 percent by weight dimethylhydrazine gel and from 10 to 30 percent by weight aluminum; said gel consisting essentially of about 1% by weight aluminum acetate, 9% by weight carboxymethylcellulose and 90% by weight dimethylhydrazine, comprising
  injecting nitrogen tetraoxide into said combustion chamber in a ratio of 75 parts nitrogen tetraoxide to 25 parts solid fuel.

References Cited
UNITED STATES PATENTS

| | | | |
|---|---|---|---|
| 3,068,641 | 12/1962 | Fox | 149—74 X |
| 3,077,072 | 12/1963 | Rice | 149—36 X |
| 3,164,505 | 1/1965 | Hsuh et al. | 149—2 X |

BENJAMIN R. PADGETT, Primary Examiner

U.S. Cl. X.R.
149—36, 74